US012541661B1

(12) United States Patent
Martinez

(10) Patent No.: US 12,541,661 B1
(45) Date of Patent: Feb. 3, 2026

(54) IDENTIFYING RFID TAG IC MANUFACTURER USING BACKSCATTER LINK FREQUENCY

(71) Applicant: Impinj, Inc., Seattle, WA (US)

(72) Inventor: Rene Dominic Martinez, Seattle, WA (US)

(73) Assignee: Impinj, Inc, Seattle, WA (US)

( * ) Notice: Subject to any disclaimer, the term of this patent is extended or adjusted under 35 U.S.C. 154(b) by 0 days.

(21) Appl. No.: 18/899,053

(22) Filed: Sep. 27, 2024

Related U.S. Application Data

(60) Provisional application No. 63/586,615, filed on Sep. 29, 2023.

(51) Int. Cl.
*G06K 7/10* (2006.01)
(52) U.S. Cl.
CPC .................. *G06K 7/10297* (2013.01)
(58) Field of Classification Search
None
See application file for complete search history.

(56) References Cited

U.S. PATENT DOCUMENTS

| | | | |
|---|---|---|---|
| 8,390,431 B1 * | 3/2013 | Diorio ............... | G06K 7/10297 340/10.5 |
| 2005/0052279 A1 * | 3/2005 | Bridgelall ......... | G06K 19/0724 340/10.1 |

* cited by examiner

*Primary Examiner* — Kristy A Haupt
(74) *Attorney, Agent, or Firm* — Turk IP Law, LLC

(57) ABSTRACT

An RFID tag IC manufacturer may be identified using a backscatter link frequency. An RFID reader may transmit a command, such as a Query-type command, and include an analog parameter specifying a first reply frequency and a digital parameter specifying a second reply frequency different from the first reply frequency. A receiving the command, RFID tag IC may respond using either the first reply frequency or the second frequency, depending on its manufacturer. For example, a first RFID tag IC with a set of first features may use the first reply frequency, while a second RFID tag IC with a set of second features may reply using the second BLF, or vice versa. The RFID reader, upon receiving the RFID tag IC response, may identify a manufacturer of the RFID tag IC based on the reply frequency, and infer one or more features and capabilities of the RFID tag IC.

20 Claims, 11 Drawing Sheets

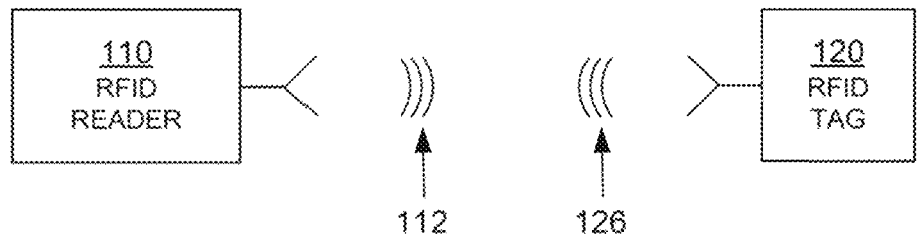
FIG. 1
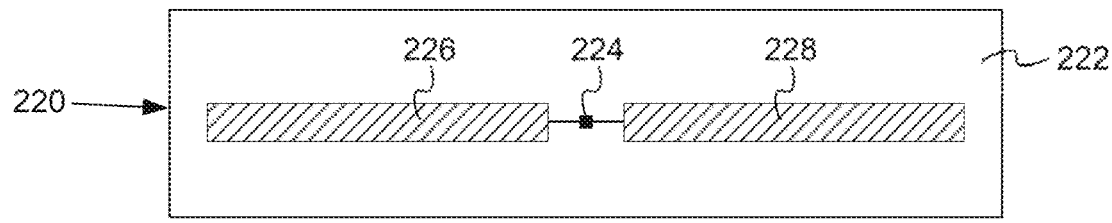
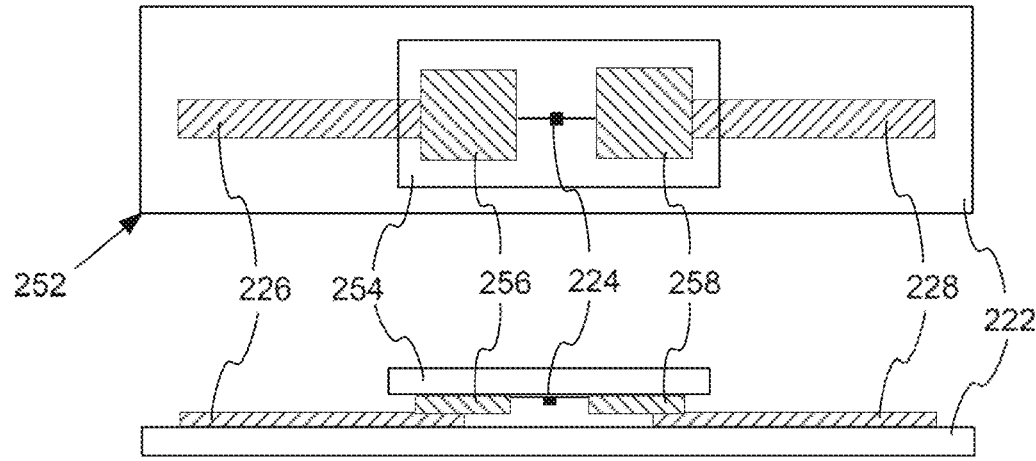
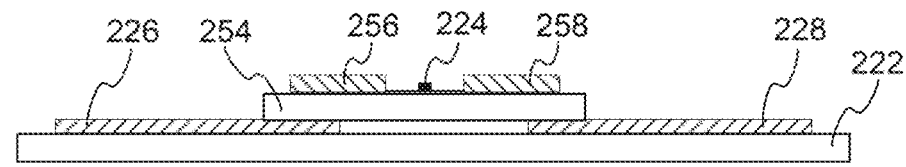
FIG. 2

| DR: Divide Ratio | TRcal (μs +/- 1%) | BLF: Link Frequency (kHz) | DBLF: Digital BLF (kHz) | QueryX Frequency Tolerance FrT (extended temp) | Query Frequency Tolerance FrT (nominal temp) | Query Frequency Tolerance FrT (extended temp) | Frequency variation during backscatter |
|---|---|---|---|---|---|---|---|
| 64/3 | 33.3 | 640 | 001₂ | +/- 7% | +/- 15% | +/- 15% | +/- 2.5% |
| | 33.3 < TRcal ≤ 50.0 | 427 < BLF < 640 | 101₂ | +/- 7% | +/- 22% | +/- 22% | +/- 2.5% |
| | 50.0 | 427 | 010₂ | +/- 7% | +/- 22% | +/- 22% | +/- 2.5% |
| | 50.0 < TRcal < 66.7 | 320 < BLF < 427 | 101₂ | +/- 7% | +/- 22% | +/- 22% | +/- 2.5% |
| | 66.7 | 320 | 011₂ | +/- 7% | +/- 10% | +/- 15% | +/- 2.5% |
| | 66.7 < TRcal ≤ 83.3 | 256 < BLF < 320 | 101₂ | +/- 7% | +/- 12% | +/- 15% | +/- 2.5% |
| | 83.3 | 256 | 100₂ | +/- 7% | +/- 10% | +/- 10% | +/- 2.5% |
| | 83.3 < TRcal < 133.3 | 160 < BLF < 256 | 101₂ | +/- 7% | +/- 10% | +/- 12% | +/- 2.5% |
| | 133.3 | 160 | 111₂ | +/- 7% | +/- 7% | +/- 7% | +/- 2.5% |
| | 133.3 < TRcal ≤ 200 | 107 ≤ BLF < 160 | 110₂ | +/- 7% | +/- 7% | +/- 7% | +/- 2.5% |
| | 200 < TRcal ≤ 225 | 95 ≤ BLF < 107 | 110₂ | +/- 5% | +/- 5% | +/- 5% | +/- 2.5% |

FIG. 9A

| DR: Divide Ratio | TRcal[1] (μs +/-1%) | BLF: Link Frequency (kHz) | QueryX Frequency Tolerance FrT (extended temp) | DBLF: Digital BLF (kHz) | Query Frequency Tolerance FrT (nominal temp) | Query Frequency Tolerance FrT (extended temp) | Frequency variation during backscatter |
|---|---|---|---|---|---|---|---|
| 8 | 17.2 ≤ TRcal < 18.74 | 427 < BLF ≤ 465 | +/- 7% | 101$_2$ | +/- 19% | +/- 19% | +/- 2.5% |
| | 18.74 | 427 | +/- 7% | 010$_2$ | +/- 19% | +/- 19% | +/- 2.5% |
| | 18.74 < TRcal < 25 | 320 < BLF < 427 | +/- 7% | 101$_2$ | +/- 19% | +/- 19% | +/- 2.5% |
| | 25 | 320 | +/- 7% | 011$_2$ | +/- 10% | +/- 15% | +/- 2.5% |
| | 25 < TRcal < 31.25 | 256 < BLF < 320 | +/- 7% | 101$_2$ | +/- 12% | +/- 15% | +/- 2.5% |
| | 31.25 | 256 | +/- 7% | 100$_2$ | +/- 10% | +/- 10% | +/- 2.5% |
| | 31.25 < TRcal < 50 | 160 < BLF < 256 | +/- 7% | 101$_2$ | +/- 10% | +/- 10% | +/- 2.5% |
| | 50 | 160 | +/- 7% | 111$_2$ | +/- 7% | +/- 7% | +/- 2.5% |
| | 50 < TRcal ≤ 75 | 107 ≤ BLF < 160 | +/- 7% | 110$_2$ | +/- 7% | +/- 7% | +/- 2.5% |
| | 75 < TRcal ≤ 200 | 40 ≤ BLF ≤ 107 | +/- 4% | 110$_2$ | +/- 4% | +/- 4% | +/- 2.5% |

FIG. 9B

IDENTIFYING RFID TAG IC MANUFACTURER USING BACKSCATTER LINK FREQUENCY

CROSS-REFERENCE TO RELATED APPLICATIONS

This application claims priority to U.S. Provisional Patent Application Ser. No. 63/586,615 filed on Sep. 29, 2023. The disclosures of the Provisional Application are hereby incorporated by reference in their entirety.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting an RF wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgment signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in a number of ways.

RFID tag integrated circuits (ICs) from different manufacturers may have different features and capabilities. For example, RFID tag ICs compliant with the Gen2 Protocol may store a tag identifier (TID). The TID includes at least one field, mask designer identifier (MDID), that identifies the manufacturer of the tag IC. A user may use a Gen2 Read command to retrieve the TID, but in general would have to inventory the tag first (involving a series of reader-tag exchanges) before using the Read command. Thus, the process of determining a tag's manufacturer (and thereby its features and capabilities) may be time consuming, which may be impractical in situations where tagged items may be moving fast by an RFID reader.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Examples are directed to identifying an RFID tag IC manufacturer using backscatter link frequency. According to some example, a method for a Radio Frequency Identification (RFID) reader system to identify a manufacturer of an RFID integrated circuit (IC) may include transmitting, to the RFID IC, a command including an analog parameter instructing a first reply frequency and a digital parameter instructing a second reply frequency different from the first reply frequency; receiving, from the RFID IC, a backscattered response at a third reply frequency; determining a correspondence between the third reply frequency and one of the first and second reply frequencies; and identifying the IC manufacturer from the determined correspondence.

According to further examples, a Radio Frequency Identification (RFID) reader system may include a reader module configured to send commands and receive replies; and a processing block coupled to the reader module. The processing block may be configured to transmit, via the reader module, a command including an analog parameter instructing a first reply frequency and a digital parameter instructing a second reply frequency different from the first reply frequency; receive, via the reader module, a response backscattered from an RFID IC at a third reply frequency; determine a correspondence between the third reply frequency and one of the first and second reply frequencies; and identify an IC manufacturer of the RFID IC from the determined correspondence.

According to yet further examples, a Radio Frequency Identification (RFID) integrated circuit (IC) may include a transceiver configured to receive wireless commands and use backscatter to send wireless replies; and a processing block coupled to the transceiver. The processing block may be configured to receive, via the transceiver, a command including an analog parameter instructing a first reply frequency and a digital parameter instructing a second reply frequency different from the first reply frequency; determine that the RFID IC supports backscattering replies using either the first reply frequency or the second reply frequency; and backscatter, via the transceiver, a reply based on the first reply frequency and not the second reply frequency.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIGS. 9A and 9B illustrate an example table of different BLFs and their corresponding DRs, TRcal values, digital BLF (DBLF) values, and their required frequency tolerances for different Query-type commands.

DETAILED DESCRIPTION

Figure 3:
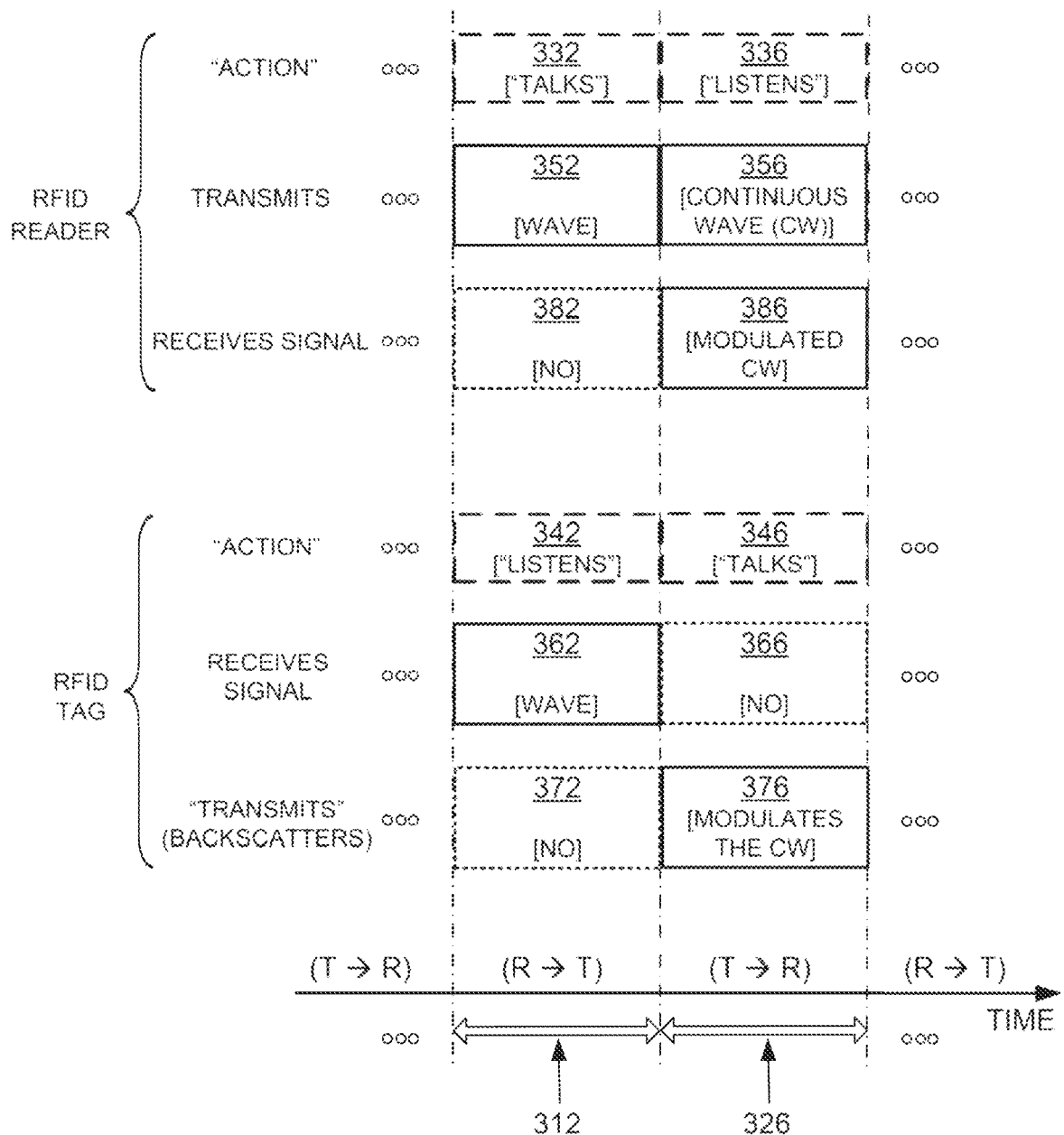
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa). One such protocol is the Class-1 Generation-2 UHF RFID Protocol for Communications at 860 MHz-960 MHz by GS1 EPCglobal, Inc. ("the Gen2 Protocol"), versions 1.2.0, 2.0, and 3.0 of which are hereby incorporated by reference. Another protocol is the ISO/IEC 18000-63 Information technology-Radio frequency identification for item management—Part 63: Parameters for air interface communications at 860 MHz to 960 MHz Type C ("ISO/IEC 18000-63"), also hereby incorporated by reference.

A manufacturer, and thereby different features and capabilities of an RFID tag IC may be determined from a Mask Designer Identifier (MDID) field contained within a tag identifier (TID) stored at the tag according to the Gen2 Protocol. However, the TID is retrieved through a Gen2 Read command following an inventory round. Thus, the process of determining a tag IC's manufacturer (and thereby its features and capabilities) may be time consuming, which may be impractical in situations where tagged items may be moving fast by an RFID reader.

There are a number of technical advantages of the example implementations. For example, an RFID reader may identify an RFID tag IC's manufacturer and its features/capabilities much faster compared to completing an inventory round and a Read command exchange. The reader may identify the RFID tag IC's manufacturer even faster compared to tag ICs which transmit their TID during an inventorying round. This may allow the reader to process RFID tags for tagged items that pass by the reader rapidly.

Of course, tags may be configured to operate using various standard protocols (e.g., the Gen2 Protocol and/or ISO/IEC 18000-63) and perform the backscatter link frequency (BLF) based tag IC manufacturer identification.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHZ, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222 (also referred to as substrate 222), which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. The antenna's reflectance can be modulated by modulating an electrical load or impedance associated with or coupled to the antenna. Electrically coupling and uncoupling the IC contacts of IC 224, thereby modulating the electrical load or impedance associated with the antenna, is one way to modulate the antenna's reflectance. Varying the impedance (or admittance) of a shunt-connected or series-connected circuit element coupled to the IC contacts, thereby modulating the electrical load or impedance coupled to the antenna, is another way to modulate the antenna's reflectance. If IC 224 is capable of transmitting signals (e.g., has its own power source, is coupled to an external power source, and/or can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging. In this case, portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the terms "RFID IC", "RFID tag", "tag", or "tag IC" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 talks (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

Figure 4:
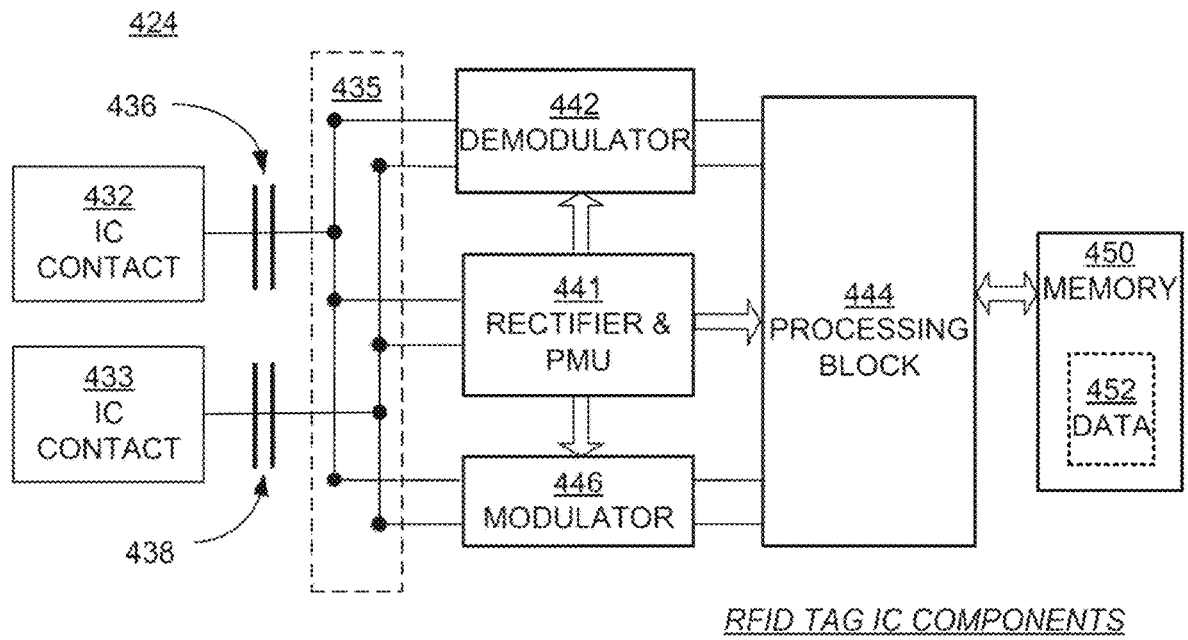
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a DC short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 224 during either or both reader-to-tag (R→T) and tag-to-reader (T→R) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452 and may be at least partly implemented as permanent or semi-permanent memory such as nonvolatile memory (NVM), EEPROM, ROM, or other memory types configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses a transmitter to generate and transmit the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

Figures 5A, 5B:
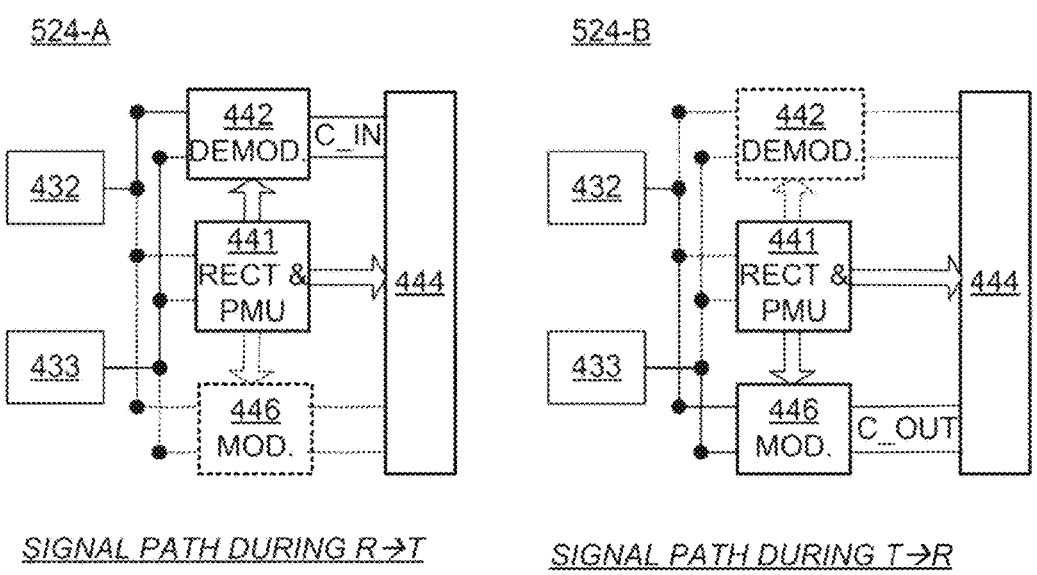
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators modulators, and/or processing blocks, each may be configured to support different protocols or different sets of protocols. A protocol specifies, in part, symbol encodings, and may include a set of modulations, rates, timings, or any other parameter associated with data communications. A protocol can be a variant of an internationally ratified protocol such as the Gen2 Protocol, for example including fewer or additional commands than the ratified protocol calls for, and so on. In some instances, additional commands may sometimes be called custom commands.

Figure 6:
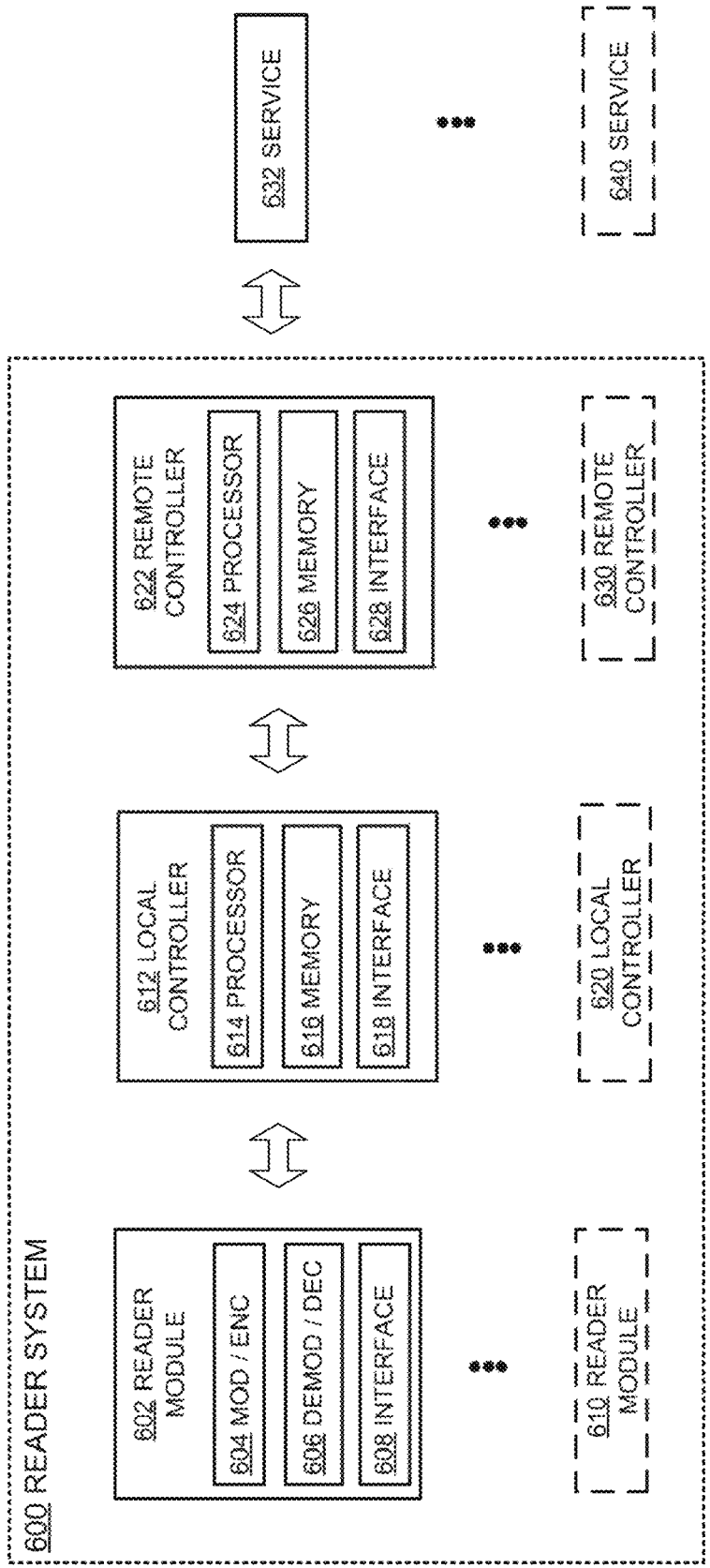
FIG. 6 is a block diagram showing a detail of an RFID reader system, such as the one shown in FIG. 1.

FIG. 6 depicts an RFID reader system 600 according to embodiments. Reader system 600 is configured to communicate with RFID tags and optionally to communicate with entities external to reader system 600, such as a service 632. Reader system 600 includes at least one reader module 602, configured to transmit signals to and receive signals from RFID tags. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller 630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/decoder block 606 may demodulate and decode signals received from RFID tags to recover data sent from the tags. The modulation, encoding, demodulation, and decoding may be performed according to a protocol or specification, such as the Gen2 Protocol. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 614, a memory 616, and an interface 618. Remote controller 622 includes a processor block 624, a memory 626, and an interface 628. Local controller 612 differs from remote controller 622 in that local controller 612 is collocated or at least physically near reader module 602, whereas remote controller 622 is not physically near reader module 602.

Processor blocks 614 and/or 624 may be configured to, alone or in combination, provide different functions. Such functions may include the control of other components, such as memory, interface blocks, reader modules, and similar; communication with other components such as reader module 602, other reader systems, services 632/640, and similar; data-processing or algorithmic processing such as encryption, decryption, authentication, and similar; or any other suitable function. In some embodiments, processor blocks 614/624 may be configured to convert analog signals to digital signals or vice-versa, as described above in relation to blocks 604/606; processor blocks 614/624 may also be configured to perform any suitable analog signal processing or digital signal processing, such as filtering, carrier cancellation, noise determination, and similar.

Processor blocks 614/624 may be configured to provide functions by execution of instructions or applications, which may be retrieved from memory (for example, memory 616 and/or 626) or received from some other entity. Processor blocks 614/624 may be implemented in any suitable way. For example, processor blocks 614/624 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624) or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for items or tags such as electronic product codes (EPCs), unique item identifiers (UIIs), tag identifiers (TIDs), or any other information suitable for identifying individual items or tags. The TID may also include a mask designer identifier (MDID) identify a tag IC manufacturer. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

Figure 7:
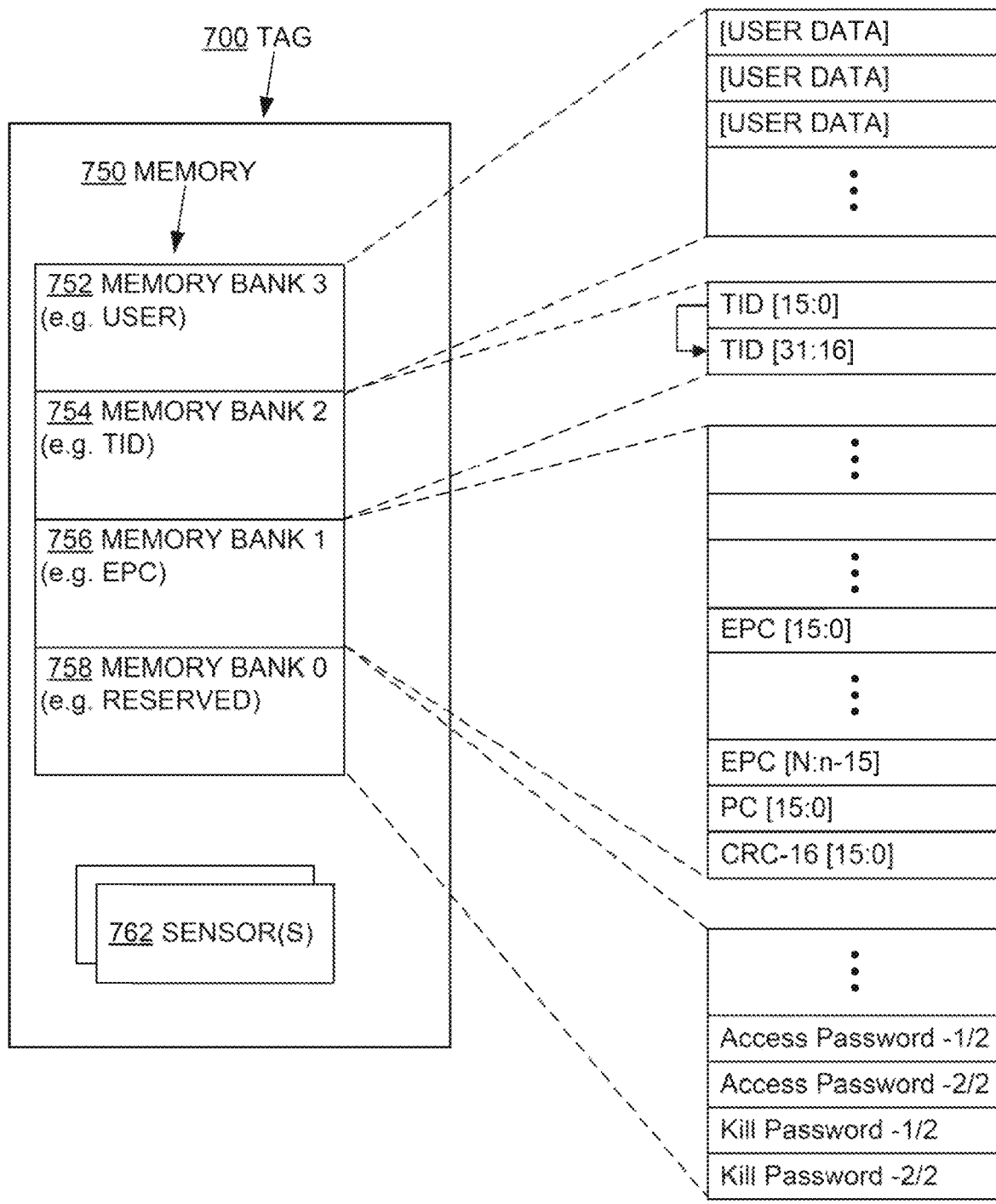
FIG. 7 is a diagram of an example RFID tag IC memory configuration, according to embodiments.

FIG. 7 is a diagram of an example RFID tag IC memory configuration, according to embodiments.

Diagram 700 shows an example RFID tag IC memory configuration, according to embodiments. Diagram 700 depicts an RFID tag IC memory 750, resembling the physical memory configuration described in the Gen2 Protocol. Memory 750 includes four partitions or sections 752, 754, 756, and 758. Partition 752 ("user memory") may be configured to store user data. Partition 754 ("TID memory") may be configured to store an identifier for the tag IC itself, such as a tag identifier or TID. In some cases, the TID may include a mask designer identifier (MDID) identifying a manufacturer of tag IC. Partition 756 ("EPC memory") may be configured to store an identifier for an item associated with or attached to the tag IC, such as an electronic product code or EPC. Partition 758 ("Reserved memory") may be configured to store information reserved for the tag IC itself or otherwise not necessarily publicly accessible, such as passwords, PINs, cryptographic keys, or similar. The Gen2 Protocol specifies that two passwords, the Access password and the Kill password, can be stored in partition 758. The Access password, if present, can be used to restrict certain tag IC operations as described in the Gen2 Protocol. The Kill password, if present, can be used to cause a tag IC to enter the Killed state as described in the Gen2 Protocol. As these passwords are sensitive, partition 758 is generally not publicly accessible.

In some example implementations, data associated with the modified inventorying commands such as memory configuration bits (e.g., the T bit), data to be compared to an inventorying command mask value, and portions or the entirety of a tag identifier (TID) and/or an item identifier (II) (e.g., EPC or UII), may be stored in one or more specific memory banks. For example, the memory configuration bit(s) may be stored in bank 1 (e.g., the Gen2 Protocol specifies that the T bit is bit 17h of bank 1, which is EPC memory). The configuration of tag IC memory 750 is provided as an example. Tag IC memory can have any number of partitions configured to store any suitable information.

Figure 8:
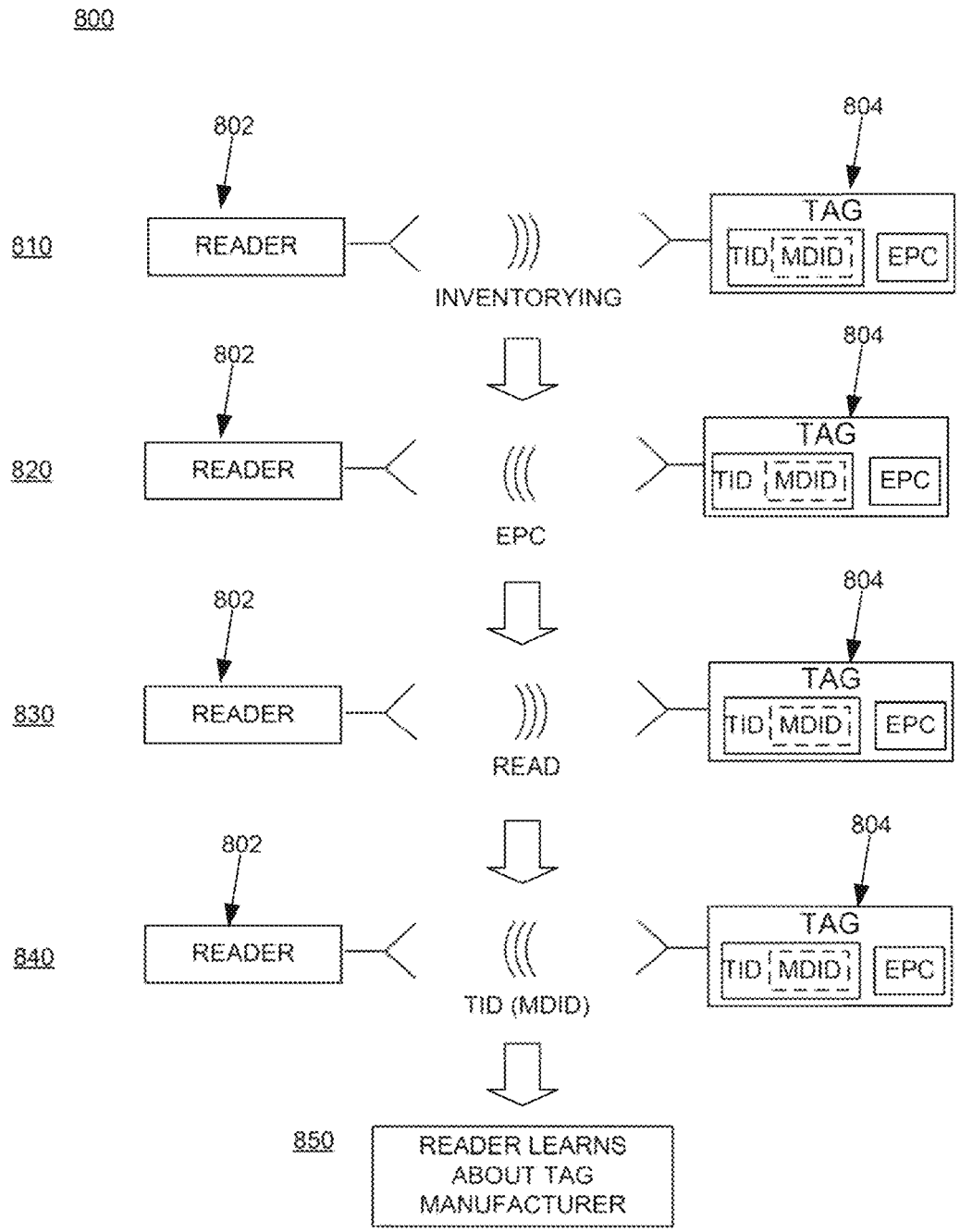
FIG. 8 illustrates how an RFID reader may learn about a manufacturer of an RFID tag through receiving an MDID value from the RFID tag in response to a Read command following inventorying.

FIG. 8 illustrates how an RFID reader 802 may learn about a manufacturer of an RFID tag 804 through receiving a Mask Designer Identifier (MDID) value from the RFID tag in response to a Read command following inventorying.

RFID tag ICs in compliance with standard protocols such the Gen2 Protocol may implement an MDID field that identifies the manufacturer of the tag IC. Knowing the manufacturer may allow an RFID reader to ascertain features and capabilities of the tag IC. One way to identify the manufacturer is to retrieve the MDID field value. A standard way of accomplishing this may be by retrieving the MDID field value through a Read command from the reader. However, according to the Gen2 Protocol, the Read command has to be sent after singulation of the tag. Diagram 800 shows such a process, where at step 810, a reader 802 sends an inventorying command that tag 804 responds to. The tag 804 (tag IC) responds by sending its electronic product code (EPC) at step 820, thereby completing the singulation process. Then, the reader 802 transmits a Read command indicating it wants the value of the MDID field at step 830. The tag 804 responds with its MDID field value at step 840, which allows the reader to learn about the manufacturer, and thereby potentially at least some of the capabilities and features of the tag IC of tag 804, at step 850.

Thus, the process of determining a tag's manufacturer (and its features and capabilities) may be time consuming. This may be impractical in situations where tagged items are moving quickly past an RFID reader such as, for example, tagged items on a moving belt or at a facility exit point. Some tag IC manufacturers have tag ICs that may respond during the inventory process with their tag identifiers (TIDs), which include the MDID, in addition to or in place of the EPC. This may obviate the need for a subsequent Read command, however, in these situations the tag IC still needs to transmit its TID, which may result in a loss of processing time.

In some examples, the manufacturer, features, and/or capabilities of a tag IC on an RFID tag may be identified based on some characteristic of a response from the tag. An RFID tag operating according to the Gen2 Protocol may respond to an RFID reader using a backscatter link frequency, or BLF. The RFID reader instructs receiving tags about the BLF to use when replying by providing parameters that allow a tag to determine the appropriate BLF. In some versions of the Gen2 Protocol, the reader provides both a TRcal (Tag-to-Interrogator calibration symbol) parameter, used to calibrate tag-to-reader communication, and a divide ratio, or DR, in an inventory command such as a Query or QueryX command. The TRcal parameter may be sent as a symbol in a preamble of the inventory command (which may be considered part of the inventorying command), with the length or time duration of the symbol representing the TRcal parameter. The DR specifies one of two possible divide ratio values that can be used (8 or 64/3) and may be provided as a bit value in a data field of the inventory command. After receiving the inventory command, the RFID tag can compute the BLF by dividing the DR by the TRcal (i.e., BLF=DR/TRcal).

In other versions of the Gen2 Protocol, certain inventory commands (e.g., a QueryX command) may, in addition to the DR and TRcal pair, also include a digital BLF (digital backscatter link frequency, or DBLF) parameter whose value directly specifies a single BLF value or a range of BLF values. In these situations, the RFID tag may determine an appropriate BLF to use based either on the DBLF parameter or the DR and TRcal pair sent with the inventory command.

An RFID tag or tag IC may implement one or more oscillators configured to allow the tag/tag IC to respond using specified BLFs. For example, the tag IC may implement one or more astable or free-running oscillators, which do not require triggering for operation. For example, an oscillator implemented by an RFID tag IC may be "free-running" if it is not calibrated wirelessly (e.g., via a wirelessly transmitted triggering/calibration signal) in preparation for or during wireless communication to or from the RFID tag IC. The outputs of the oscillator(s) may be adjustable, to allow supporting multiple, different BLFs. The oscillator(s) may be part of a tag IC's processing block (e.g., processing block 444), or may be separate. An oscillator may be configured to allow a tag or tag IC to respond using a BLF (also referred to as "supporting a BLF") when it can provide an output signal having a frequency that allows the tag/tag IC to generate and send a reply based on or modulated at the BLF. Such an oscillator may provide an output signal having a frequency equal to the BLF, or equal to some multiple, factor, or variant of the BLF such that the tag/tag IC can use the output signal to generate and send replies based on/modulated at the BLF.

FIGS. 9A and 9B illustrate an example table of different BLFs and their corresponding DRs, TRcal values, digital BLF (DBLF) values, and their required frequency tolerances for different inventory commands.

Table 900A in FIG. 9A depicts BLFs and their corresponding DRs, TRcal values, DBLF values, and their required frequency tolerances for a DR value of 64/3 for Query and QueryX inventory commands. Table 900B in FIG. 9B depicts BLFs and their corresponding DRs, TRcal values, DBLF values, and their required frequency tolerances for a DR value of 8 for Query and QueryX inventory commands.

It should be noted that different inventory commands can require different frequency tolerances for BLF. For example, to correctly respond when a QueryX command specifies a BLF of 640 kHz, a tag has to be able to support that BLF with a frequency tolerance of +/−7%, whereas in order to correctly respond when a Query command specifies the same BLF of 640 kHz the tag only has to be able to support that BLF with a frequency tolerance of +/−15%. As the specified BLFs decrease in frequency, the frequency tolerances for Query commands generally become stricter (represented by a decrease in the magnitudes of the associated+/−percentages), until the frequency tolerances for both the QueryX and Query commands match starting at BLFs of 160 kHz and below.

It should also be noted that certain DBLF values correspond to specific BLF values, whereas other DBLF values correspond to ranges of BLF values. For example, a DBLF value of 001 (in binary) corresponds to a BLF of 640 kHz, but a DLBF value of 101 (in binary) may correspond to BLF values between 160 and 640 kHz, excluding 256, 320, and 427 kHz.

In some situations, when a reader sends an inventory command it can specify BLF using DBLF and/or the combination of DR and TRcal. For example, the reader can specify a BLF of 640 kHz in an inventory command by specifying a DBLF value of 001 (binary), a DR of 64/3, and a TRcal of 33.3. When a tag receives the inventory command, it can determine the BLF using either the DBLF or the DR/TRcal combination. In some cases, only certain inventory commands (e.g., Gen2 QueryX commands) can specify DBLF, DR, and TRcal, while other inventory commands (e.g., Gen2 Query commands) can only specify DR and TRcal.

If the reader is to specify a BLF that does not correspond to an assigned DBLF value (e.g., 160 kHz, 256 kHz, 320 kHz, 427 kHz, or 640 kHz), the reader may send an inventory command that specifies an appropriate DR and TRcal, while specifying a DBLF that covers the range within which the BLF falls. For example, suppose the reader is to specify a BLF of 630 kHz. The reader may send an inventory command specifying a DR and TRcal combination that results in a BLF of 630 kHz, while specifying a DBLF of 101 (binary). The DBLF value of 101 (binary) indicates that the specified BLF falls within a particular range, excluding certain specific frequencies. When a tag receives the inventory command, it can only determine the specific BLF using the DR/TRcal combination, because the DBLF does not specify the exact BLF.

In some situations, an RFID tag IC may not be configured to support all potential BLFs at all required tolerances. For example, an RFID tag that supports the Gen2 QueryX command may support (i.e., be able to send replies at) BLFs of 640, 427, 320, 256, and 160 kHz, at the stricter QueryX-specified+/−7% frequency tolerances. These values correspond with DBLF values of 001, 010, 011, 100 and 111 (all in binary). However, such RFID tags may not be required to support BLFs other than these values at the stricter QueryX specified tolerances, except for those BLFs whose frequency tolerances are the same for both QueryX and Query (e.g., BLFs starting from 95 kHz and up to 160 kHz). Accordingly, some RFID tag IC manufacturers may opt to only support the specific BLFs at the stricter tolerances but not support the BLF ranges at those stricter frequency tolerances, for example to simplify oscillator designs and reduce costs. In this situation, such a tag IC May ignore an inventory command that has a DBLF value that corresponds to a BLF range with stricter tolerances, or tolerances that the tag IC is not configured to support. For example, an RFID tag IC may be configured to support BLFs of 640 kHz, 427 kHz, 320 kHz, 256 kHz, and 160 kHz at a tolerance of +/−7% but may not support all BLFs between 640 kHz and 160 kHz at the same tolerance of +/−7%. In this situation, when the tag IC receives an inventory command with a DBLF of 101 (binary), the tag IC may determine that it can't support all BLFs within that range at the required tolerance and therefore ignore the rest of the inventory command. Other RFID tag IC manufacturers may opt to support both the specific BLFs and the BLF ranges at stricter tolerances.

One way to differentiate between tag ICs that support both DBLF-specified frequencies and DBLF-specified ranges and tag ICs that don't may be to use an inventory command that includes a DBLF value that corresponds to a specific BLF but have DR/TRcal values that result in a different BLF. For example, an inventory command may have a DBLF value of 010 (binary), corresponding to a BLF of 427 kHz. However, the inventory command may have DR/TRcal values that, when used to compute a BLF, result in a computed BLF different than 427 kHz (e.g., 400 kHz or 500 kHz). An RFID tag receiving such an inventory command may be configured to decide how it should determine the BLF it is to use.

One example approach to differentiate between tags that only support specific BLFs at stricter tolerances and tags that also support BLF ranges at stricter tolerances is to send an inventory command including a DBLF for a stricter tolerance BLF (e.g., 427 kHz, corresponding to DBLF=010 (in binary)) but DR/TRcal values that result in a different stricter tolerance BLF not associated with a specific DBLF value (e.g., 500 kHz). Tags that only support specific stricter tolerance BLFs may respond using the BLF specified by the DBLF value (e.g., 427 kHz), whereas tags that also support ranges of stricter tolerance BLFs may respond using the BLF computed from DR/TRcal (e.g., 500 kHz). A receiving reader may then determine, from the BLF of the tag response, the extent to which the tag supports ranges of stricter tolerance BLFs. From this information, the manufacturer of the tag or tag IC may be determined or inferred.

Figure 10:
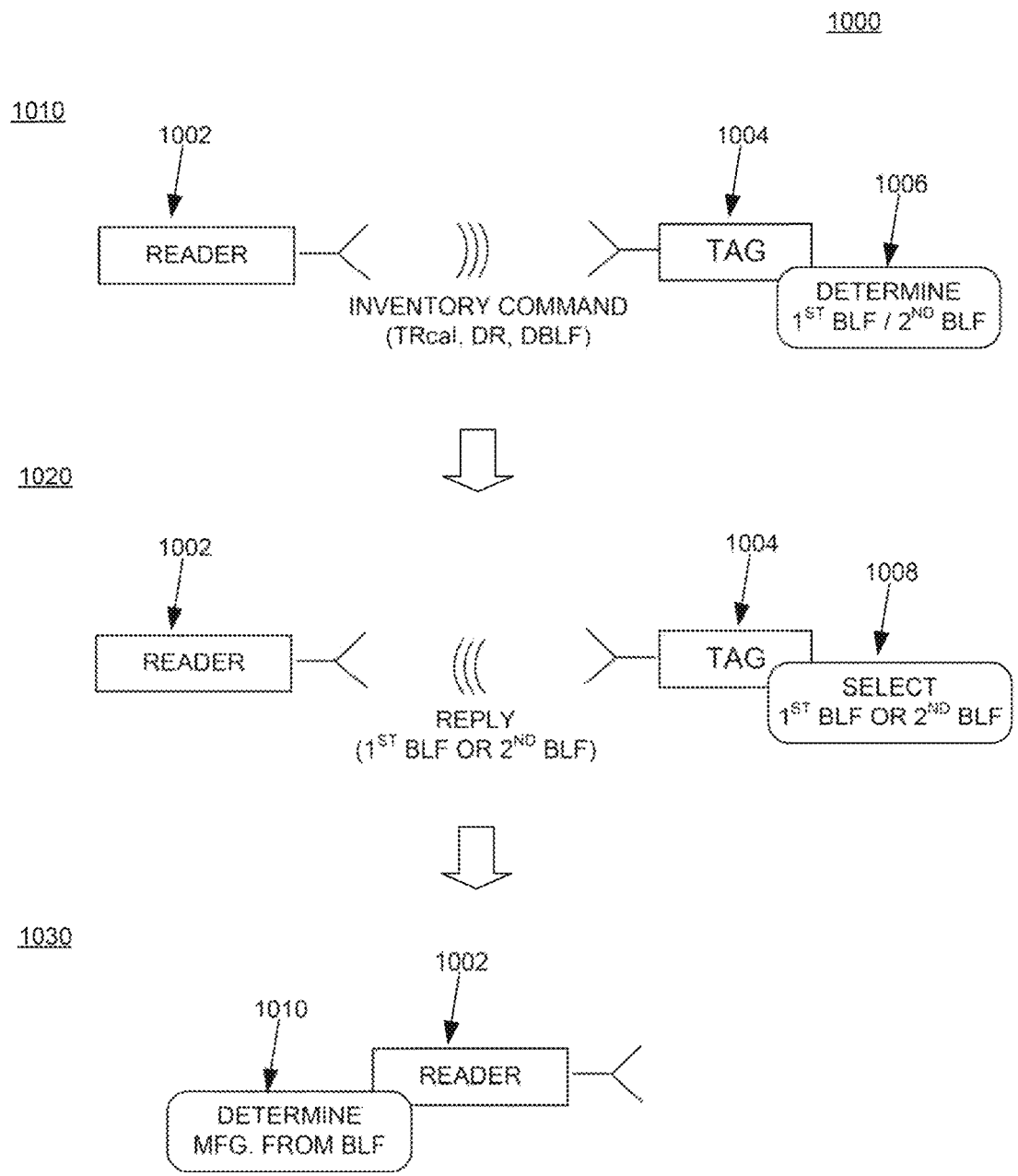
FIG. 10 illustrates how an RFID reader may learn about a manufacturer of an RFID tag through an RFID tag reply frequency, according to examples.

FIG. 10 illustrates how an RFID reader 1002 may learn about a manufacturer of an RFID tag 1004 through an RFID tag reply frequency, according to examples. The reader 1002 may be a reader system, such as the reader system 600 described above.

According to some examples, a tag 1004, compliant with the Gen2 Protocol, may respond to a reader 1002 using a backscatter link frequency, or BLF, instructed by the reader 1002. The reader 1002 instructs the tag 1004 to use a certain BLF by providing parameters that allow the tag to determine the appropriate BLF. In some versions of the Gen2 Protocol, the reader 1002 provides a TRcal parameter, used to calibrate tag-to-reader communication, and a divide ratio, or DR, in an inventory command such as a Query or QueryX command. The TRcal parameter may be sent as a symbol in a preamble of the inventory command (which may be considered part of the inventorying command), with the length or time duration of the symbol representing the TRcal parameter. The DR may be provided as a bit value in a data field of the inventory command. After receiving the inventory command, at block 1006 the tag 1004 can determine a BLF, for example by dividing the DR by TRcal (i.e., BLF=DR/TRcal). The DR/TRcal combination can be referred to as an analog parameter.

In other versions of the Gen2 Protocol, certain inventory commands (e.g., a QueryX command) may also include a digital BLF (DBLF) parameter whose value directly specifies a specific BLF or range of BLFs. In these situations, the tag 1004 may determine an appropriate BLF to use based either on the DBLF parameter or the DR and TRcal pair sent with the inventory command.

The reader 1002 receiving the tag response to the inventory command may determine which BLF the responding tag 1004 used for the response. That determination may allow the reader 1002 to ascertain information about the responding tag's manufacturer, capabilities, and/or features.

Diagram 1000 shows an example process of an RFID reader 1002 determining a tag manufacturer. The process starts at step 1010, where the reader 1002 transmits an inventory command (e.g., a QueryX command) to a tag 1004. The inventory command may include a TRcal (as part of the preamble), a DR value, and a DBLF parameter. In particular, the DBLF may specify a first BLF value, while the DR and TRcal together specify a second BLF value different than the first BLF value. The tag 1004 may compute a first BLF from the TRcal and DR values as shown by block 1006. The tag 1004 may also determine a second BLF from the DBLF parameter. At step 1020, the tag 1004 may transmit its response to the reader 1002 using either the first BLF or the second BLF, which the tag 1004 may select, shown by block 1008, based on its capabilities or features. In one example, the tag 1004 may not have the capability to respond using the first BLF, and so responds using the second BLF. Upon receiving the tag response, the reader 1002 may determine which BLF is used in the tag response. At step 1030, the reader 1002 may identify tag manufacturer based on the tag reply frequency, shown at step 1010. The reader 1002 may then infer or determine at least some of the capabilities or features of the tag 1004 based on the identified manufacturer.

Figure 11:
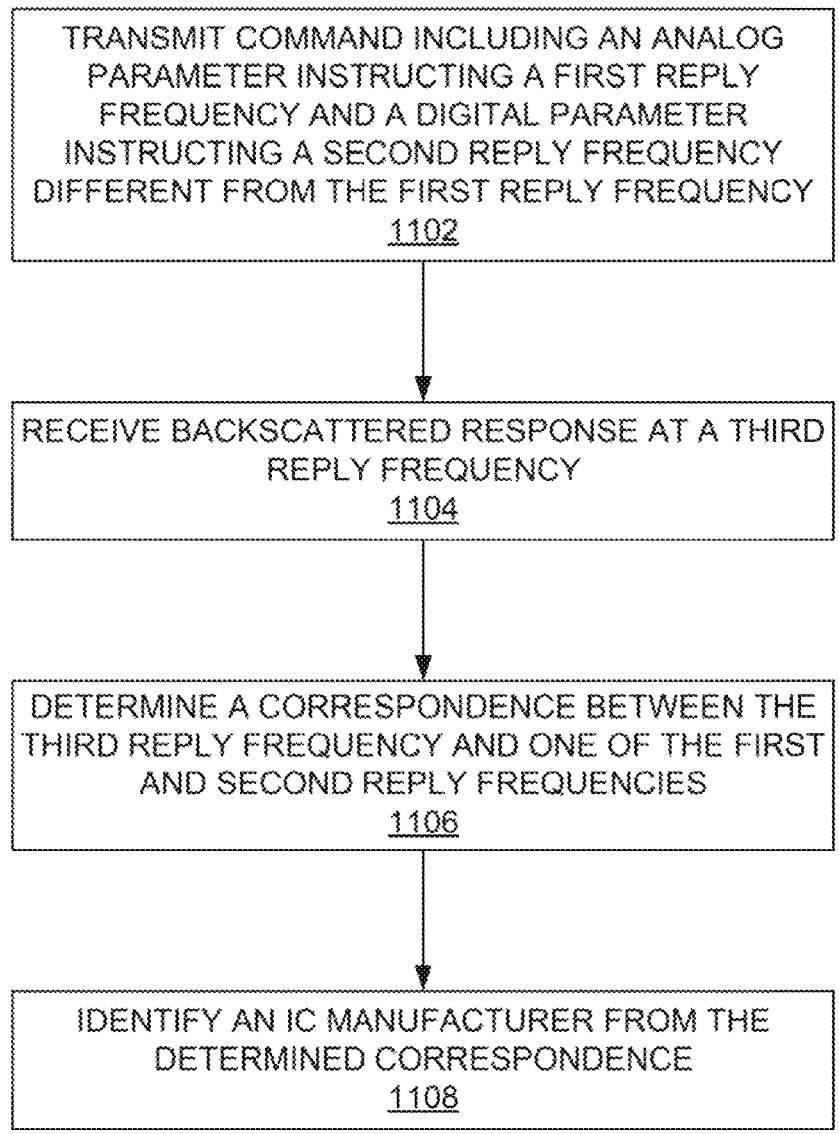
FIG. 11 illustrates a flow diagram of a method for an RFID reader to identify a manufacturer of an RFID tag, according to embodiments.

FIG. 11 illustrates a flow diagram of a method 1100 for an RFID reader system to identify a manufacturer of an RFID IC, according to embodiments.

At step 1102, the RFID reader system may transmit a command including an analog parameter instructing a first reply frequency and a digital parameter instructing a second reply frequency different from the first reply frequency. The RFID reader system may include a reader and a processing system, such as the reader system 600. The command may be an inventory command, such as a Query-type command. Examples of Query-type commands can include a Query command or QueryX command according to the Gen2 Protocol. In one example, the RFID reader system may transmit a QueryX command including a DR, a TRcal, and a DBLF value. The combination of the DR and the TRcal may be an example of an analog parameter instructing a first reply frequency, according to BLF=DR/TRcal, and the DBLF value may be an example of a digital parameter instructing a second reply frequency different from the first reply.

At step 1104, the RFID reader system may receive, from the RFID IC, a backscattered response based on a third reply frequency. The RFID IC may select, according to its features and capabilities as described herein, which of the first or second reply frequencies to base the reply at. For example, the RFID IC may determine that it supports backscattering replies at the first reply frequency, but not at the second reply frequency, using an astable or free-running oscillator. In some embodiments, the RFID IC may backscatter the reply by modulating an electrical load coupled to an antenna.

At step 1106, the RFID reader system may determine a correspondence between the third reply frequency and one of the first and second reply frequencies.

At step 1108, the RFID reader system may identify the IC manufacturer of the RFID IC from the determined correspondence. In some embodiments, the RFID reader system may identify a manufacturer based on the reply frequency. For example, if the third reply frequency corresponds to the first reply frequency, the RFID reader system may identify a first manufacturer. If the third reply frequency corresponds to the second reply frequency, then a second manufacturer different from the first manufacturer may be identified by the RFID reader system. Further, the RFID reader system may infer or determine at least some of the RFID IC's features and capabilities. For example, the first manufacturer may manufacture RFID ICs having a first set of features and capabilities, while the second manufacturer may manufacture RFID ICs having a second set of features and capabilities.

Figure 12:
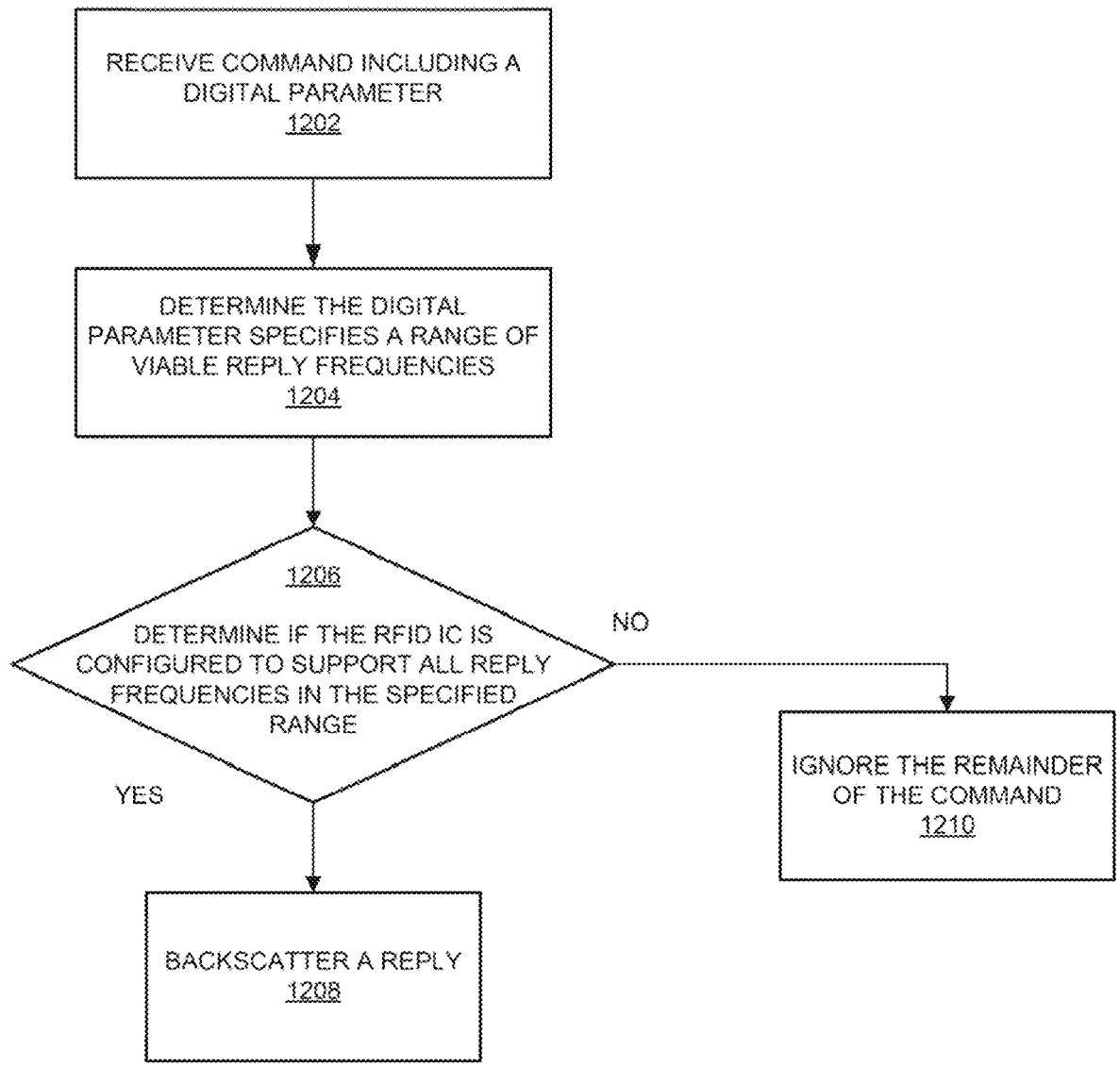
FIG. 12 illustrates a flow diagram of a method for an RFID IC to respond to an unsupported command received from an RFID reader, according to embodiments.

FIG. 12 illustrates a flow diagram of a method 1200 for an RFID IC to respond to an unsupported command received from an RFID reader, according to embodiments.

At step 1202, the RFID IC may receive a command from the RFID reader. The command may be an inventory command, such as a QueryX command according to the Gen2 Protocol. The command may include a digital parameter. In some embodiments, the command may further include an analog parameter.

At step 1204, the RFID IC may determine that the digital parameter specifies a range of viable reply frequencies. In some embodiments, the range of viable reply frequencies may be associated with a tolerance level. In some embodiments, the digital parameter may be a digital backscatter link frequency (DBLF) value that specifies a range of viable reply frequencies. For example, the digital parameter may be a binary DBLF value, 101, that specifies a range, 427 kHz-640 kHz, having a tolerance level of ±7%. In some embodiments, the command may further include an analog parameter instructing a first reply frequency that is within the range of viable reply frequencies specified by the digital parameter.

At step 1206, the RFID IC may determine if the RFID IC is configured to or is able to support all reply frequencies in the range of viable reply frequencies specified by the digital parameter. For example, the RFID IC may determine that it is configured to support all reply frequencies in the specified range using an astable or free-running oscillator. In another example, the RFID IC may determine that it is not configured to or is unable to support all reply frequencies in the specified range at a required tolerance level.

At step 1208, if the RFID IC is configured to or is able to support all reply frequencies in the specified range, the RFID IC may backscatter a reply based on a frequency in the range of viable reply frequencies. In some embodiments, the RFID IC may backscatter the reply by modulating an electrical load coupled to an antenna. In some embodiments, the command may include an analog parameter instructing a first reply frequency that is within the range specified by the digital parameter, and the RFID IC may backscatter the reply at having the first reply frequency.

At step 1210, if the RFID is not configured to or is unable to support all reply frequencies in the specified range, as a response to not being configured to or unable to support all reply frequencies, the RFID IC may ignore the remainder of the command.

According to some example, a method for a Radio Frequency Identification (RFID) reader system to identify a manufacturer of an RFID integrated circuit (IC) may include transmitting, to the RFID IC, a command including an analog parameter instructing a first reply frequency and a digital parameter instructing a second reply frequency different from the first reply frequency; receiving, from the RFID IC, a backscattered response at a third reply frequency; determining a correspondence between the third reply frequency and one of the first and second reply frequencies; and identifying the IC manufacturer from the determined correspondence.

According to other examples, if the third reply frequency corresponds to the first reply frequency, then a first manufacturer may be identified, and if the third reply frequency corresponds to the second reply frequency, then a second manufacturer different from the first manufacturer may be identified. The method may further include determining at least some of the capabilities or features of the RFID IC based on the identified manufacturer. The analog parameter may be a divide ratio (DR)/TRcal pair instructing the first reply frequency, and the digital parameter may be a digital backscatter link frequency (DBLF) value instructing the second reply frequency. The analog parameter may specify a divide ratio of 8 or 64/3. The command may be an inventory command. The inventory command may be a QueryX command according to the Gen2 Protocol.

According to further examples, a Radio Frequency Identification (RFID) reader system may include a reader module configured to send commands and receive replies; and a processing block coupled to the reader module. The processing block may be configured to transmit, via the reader module, a command including an analog parameter instructing a first reply frequency and a digital parameter instructing a second reply frequency different from the first reply frequency; receive, via the reader module, a response backscattered from an RFID IC at a third reply frequency; determine a correspondence between the third reply frequency and one of the first and second reply frequencies; and identify an IC manufacturer of the RFID IC from the determined correspondence.

According to yet other examples, the processing block may be further configured to, if the third reply frequency corresponds to the first reply frequency, identify a first manufacturer, and, if the third reply frequency corresponds to the second reply frequency, identify a second manufacturer different from the first manufacturer. The processing block may also be configured to determine, based on the identified manufacturer, at least some of the capabilities and features of the RFID IC. The analog parameter may be a divide ratio (DR)/TRcal pair corresponding to the first reply frequency, and the digital parameter may be a digital backscatter link frequency (DBLF) value corresponding to the second reply frequency. The command may be an inventory command. The inventory command may be a QueryX command according to the Gen2 Protocol.

According to yet further examples, a Radio Frequency Identification (RFID) integrated circuit (IC) may include a transceiver configured to receive wireless commands and use backscatter to send wireless replies; and a processing block coupled to the transceiver. The processing block may be configured to receive, via the transceiver, a command including an analog parameter instructing a first reply frequency and a digital parameter instructing a second reply frequency different from the first reply frequency; determine that the RFID IC supports backscattering replies using either the first reply frequency or the second reply frequency; and backscatter, via the transceiver, a reply based on the first reply frequency and not the second reply frequency.

According to other examples, the backscattering the reply may include modulating an electrical load coupled to an antenna. The analog parameter may be a divide ratio (DR)/TRcal pair corresponding to the first reply frequency, and the digital parameter may be a digital backscatter link frequency (DBLF) value corresponding to the second reply frequency. The analog parameter may specify a divide ratio (DR) of either 8 or 64/3. The RFID IC may support the first reply frequency using a free-running oscillator. The command may be an inventory command. The inventory command may be a QueryX command according to the Gen2 Protocol.

According to some examples, a Radio Frequency Identification (RFID) integrated circuit (IC) may include a transceiver configured to receive wireless commands and a processing block coupled to the transceiver. The processing block may be configured to receive, via the transceiver, a command including a digital parameter; determine that the digital parameter specifies a range of viable reply frequencies; determine if the RFID IC is configured to or is able to support all reply frequencies in the range of viable reply frequencies; and if the RFID IC is configured to or is able to support all reply frequencies in the range of viable reply frequencies, backscatter a reply based on a frequency in the range of viable reply frequencies, or if the RFID IC is not configured to or is unable to support all reply frequencies in the range of viable reply frequencies, ignore the remainder of the command.

According to other examples, the digital parameter may be a digital backscatter link frequency (DBLF) value that specifies a range of viable reply frequencies. The command may be an inventory command. The inventory command may be a QueryX command according to the Gen2 Protocol. The range of viable reply frequencies may be associated with a tolerance level. The command may further include an analog parameter instructing a first reply frequency that is within the range of viable reply frequencies specified by the digital parameter. Backscattering the reply may include modulating an electrical load coupled to an antenna. The RFID IC may support the range of viable reply frequencies using a free-running oscillator.

According to other examples, the digital parameter may be a digital backscatter link frequency (DBLF) value that specifies a range of viable reply frequencies. The command may be an inventory command. The inventory command may be a QueryX command according to the Gen2 Protocol. The range of viable reply frequencies may be associated with a tolerance level. The command may further include an analog parameter instructing a first reply frequency that is within the range of viable reply frequencies specified by the digital parameter. Backscattering the reply may include modulating an electrical load coupled to an antenna. The RFID IC may support the range of viable reply frequencies using a free-running oscillator.

According to further examples, a method for a Radio Frequency Identification (RFID) integrated circuit (IC) to respond to an unsupported command received by an RFID reader may include receiving, by the RFID IC, via a transceiver, from the RFID reader, a command including a digital parameter; determining that the digital parameter instructs a range of viable reply frequencies; determining if the RFID IC is configured to or is able to support all reply frequencies in the range of viable reply frequencies; and if the RFID IC is configured to or is able to support all reply frequencies in the range of viable reply frequencies, backscatter a reply based on a frequency in the range of viable reply frequencies, or if the RFID IC is not configured to or is unable to support all reply frequencies in the range of viable reply frequencies, ignore the remainder of the command.

According to yet other examples, the digital parameter may be a digital backscatter link frequency (DBLF) value that specifies a range of viable reply frequencies. The command may be an inventory command. The inventory command may be a QueryX command according to the Gen2 Protocol. The range of viable reply frequencies may be associated with a tolerance level. The command may further include an analog parameter instructing a first reply frequency that is within the range of viable reply frequencies specified by the digital parameter. Backscattering the reply may include modulating an electrical load coupled to an antenna. The RFID IC may support the range of viable reply frequencies using a free-running oscillator.

According to some examples, a Radio Frequency Identification (RFID) reader system may include a reader module including a transceiver configured to send commands and receive replies and a processing block coupled to the transceiver. The processing block may be configured to transmit, via the transceiver to an RFID IC, a command including an analog parameter instructing a first reply frequency and a digital parameter specifying a range of viable second reply frequencies; receive, from the RFID IC, a response backscattered from an RFID IC at a third reply frequency; determine a correspondence between the third reply frequency and one of the first reply frequencies or the range of viable reply frequencies; and identify an IC manufacturer of the RFID IC from the determined correspondence.

According to other examples, the analog parameter may be a divide ratio (DR)/TRcal pair instructing the first reply frequency, and the digital parameter may be a digital backscatter link frequency (DBLF) value instructing the range of viable second reply frequencies. The first reply frequency may be associated with a first tolerance level, and the range of viable second reply frequencies is associated with a second tolerance level. The processing block may be further configured to determine, based on the identified manufacturer, at least some of the capabilities and features of the RFID IC.

As mentioned previously, embodiments are directed to identifying a manufacturer of an RFID tag IC. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, tags, RFICs, readers, systems, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

I claim:

1. A method for a Radio Frequency Identification (RFID) reader system to identify a manufacturer of an RFID integrated circuit (IC), the method comprising:
   transmitting, to the RFID IC, a command including an analog parameter instructing a first reply frequency and a digital parameter instructing a second reply frequency different from the first reply frequency;
   receiving, from the RFID IC, a backscattered response at a third reply frequency;
   determining a correspondence between the third reply frequency and one of the first and second reply frequencies; and
   identifying the IC manufacturer from the determined correspondence.

2. The method of claim 1, wherein
   if the third reply frequency corresponds to the first reply frequency, then a first manufacturer is identified, and
   if the third reply frequency corresponds to the second reply frequency, then a second manufacturer different from the first manufacturer is identified.

3. The method of claim 2, further comprising:
   determining at least some capabilities or features of the RFID IC based on the identified manufacturer.

4. The method of claim 1, wherein
   the analog parameter is a divide ratio (DR)/TRcal pair instructing the first reply frequency, and
   the digital parameter is a digital backscatter link frequency (DBLF) value instructing the second reply frequency.

5. The method of claim 4, where the analog parameter specifies a divide ratio of 8 or 64/3.

6. The method of claim 1, wherein the command is an inventory command.

7. The method of claim 6, wherein the inventory command is a QueryX command according to the Gen2 Protocol.

8. A Radio Frequency Identification (RFID) reader system comprising:
   a reader module configured to send commands and receive replies; and
   a processing block coupled to the reader module and configured to:
      transmit, via the reader module, a command including an analog parameter instructing a first reply frequency and a digital parameter instructing a second reply frequency different from the first reply frequency;
      receive, via the reader module, a response backscattered from an RFID IC at a third reply frequency;
      determine a correspondence between the third reply frequency and one of the first and second reply frequencies; and
      identify an IC manufacturer of the RFID IC from the determined correspondence.

9. The RFID reader system of claim 8, wherein the processing block is further configured to:
   if the third reply frequency corresponds to the first reply frequency, identify a first manufacturer, and
   if the third reply frequency corresponds to the second reply frequency, identify a second manufacturer different from the first manufacturer.

10. The RFID reader system of claim 9, wherein the processing block is further configured to:
    determine, based on the identified manufacturer, at least some capabilities and features of the RFID IC.

11. The RFID reader system of claim 8, wherein,
    the analog parameter is a divide ratio (DR)/TRcal pair corresponding to the first reply frequency, and
    the digital parameter is a digital backscatter link frequency (DBLF) value corresponding to the second reply frequency.

12. The RFID reader system of claim 8, wherein the command is an inventory command.

13. The RFID reader system of claim 12, wherein the inventory command is a QueryX command according to the Gen2 Protocol.

14. A Radio Frequency Identification (RFID) integrated circuit (IC) comprising:
    a transceiver configured to receive wireless commands and use backscatter to send wireless replies; and
    a processing block coupled to the transceiver and configured to:
       receive, via the transceiver, a command including an analog parameter instructing a first reply frequency and a digital parameter instructing a second reply frequency different from the first reply frequency;

determine that the RFID IC supports backscattering replies using either the first reply frequency or the second reply frequency; and backscatter, via the transceiver, a reply based on the first reply frequency and not the second reply frequency.

15. The RFID IC of claim 14, wherein the backscattering the reply includes modulating an electrical load coupled to an antenna.

16. The RFID IC of claim 14, wherein the analog parameter is a divide ratio (DR)/TRcal pair corresponding to the first reply frequency, and the digital parameter is a digital backscatter link frequency (DBLF) value corresponding to the second reply frequency.

17. The RFID IC of claim 16, wherein the analog parameter specifies a divide ratio (DR) of either 8 or 64/3.

18. The RFID IC of claim 14, wherein the RFID IC supports the first reply frequency using a free-running oscillator.

19. The RFID IC of claim 14, wherein the command is an inventory command.

20. The RFID IC of claim 19, wherein the inventory command is a QueryX command according to the Gen2 Protocol.

\* \* \* \* \*